Oct. 10, 1967  G. K. CHRISTIANSEN  3,346,775
COMPONENTS FOR MAKING STRUCTURES COMPRISING
ELECTRICAL CIRCUITS
Filed June 14, 1966  5 Sheets-Sheet 1
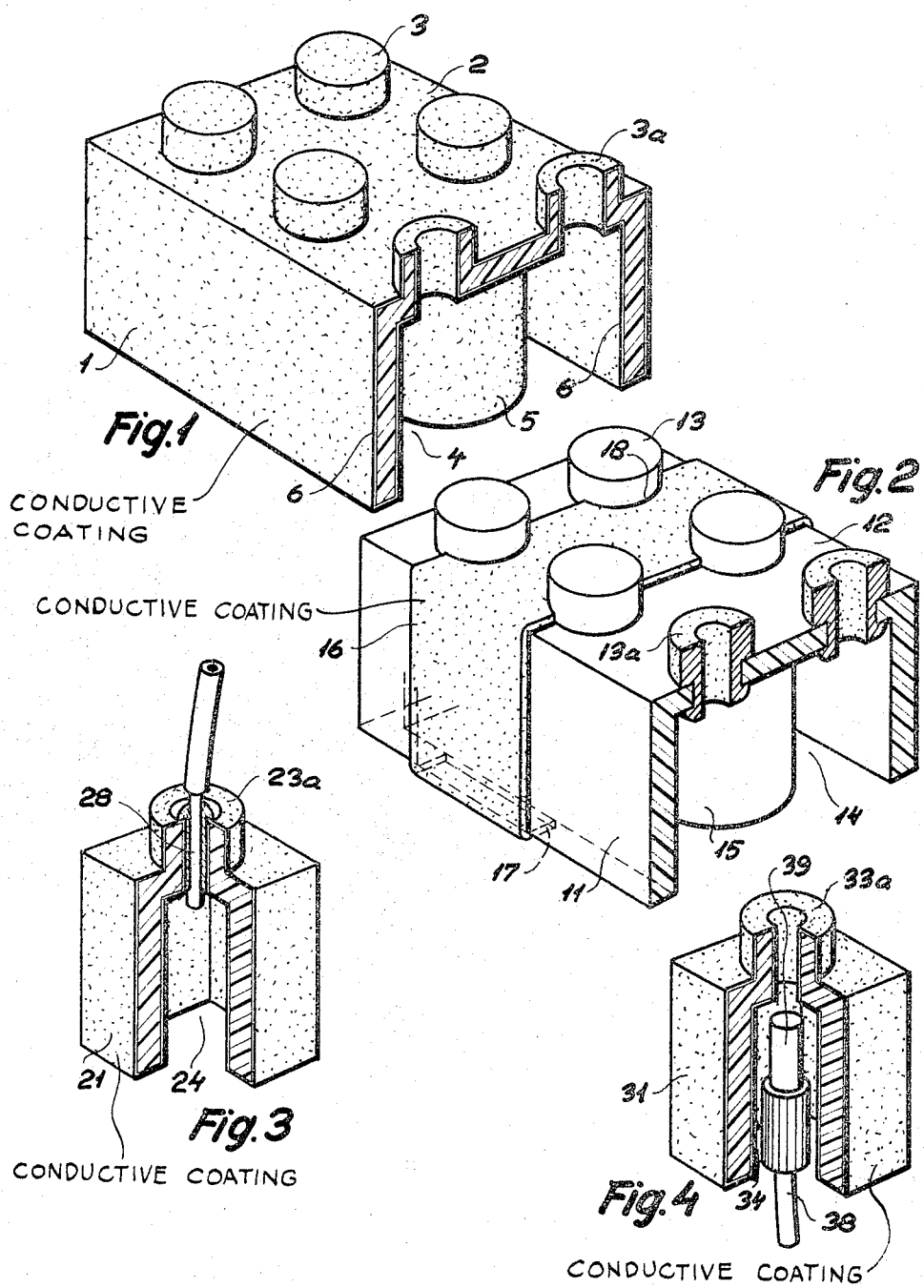

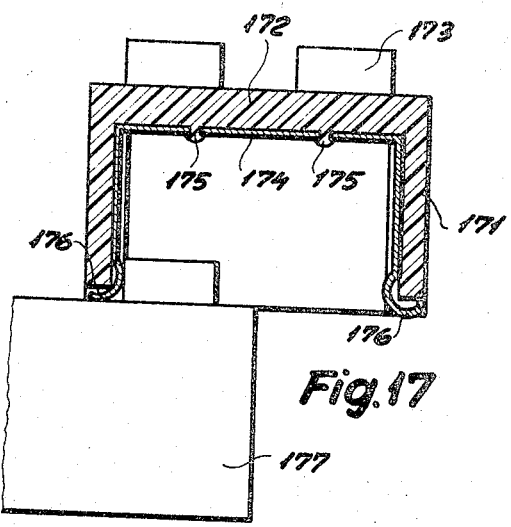
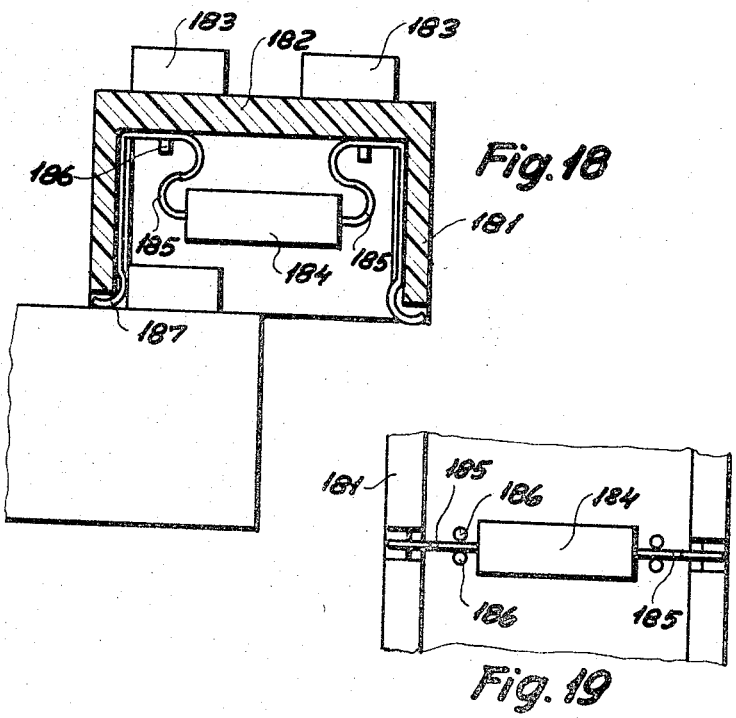

United States Patent Office 3,346,775
Patented Oct. 10, 1967

3,346,775
COMPONENTS FOR MAKING STRUCTURES
COMPRISING ELECTRICAL CIRCUITS
Godtfred Kirk Christiansen, Billund, Denmark, assignor
to Interlego A.G., Zug, Switzerland
Filed June 14, 1966, Ser. No. 557,575
Claims priority, application Denmark, June 19, 1965,
3,101/65; Germany, Mar. 1, 1966, A 51,709
10 Claims. (Cl. 317—101)

ABSTRACT OF THE DISCLOSURE

A toy building set composed of hollow building blocks provided with coupling studs for mechanically interconnecting pairs of said blocks, and wherein some of the blocks include electrical components and conductive coupling studs connected to said components to enable the building set to be used for making both mechanical toy structures and toy structures comprising electrical circuits.

---

Figure 5:
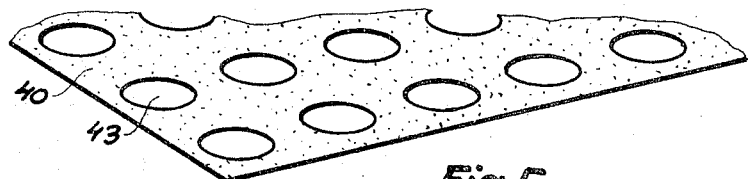

This invention relates to the art of making structures comprising electrical circuits and more particularly to the use of a building set comprising a plurality of elements made by injection moulding of thermoplastic materials and adapted to the mechanically interconnected so as to form a structure of any desired configuration including electrical circuit arrangements such as radio amplifiers, models of houses with electrical light installations, signal systems, tracks, and other electro-mechanical toy structures.

Basically, the invention comprises a further development of the well-known toy building sets comprising a plurality of injection moulded hollow plastic blocks open at one side and provided with primary projections or studs at the external bottom face opposite the open face of the block and with secondary projections or studs in the cavity of the block, said primary and secondary projections being arranged so as to form coupling means for interconnecting a pair of adjacent blocks.

It is the main object of the invention to provide a building set of this kind in which some or all of the individual elements are designed so as to enable the set to be used for building structures of the kind referred to without necessitating the use of additional accessories or operations for providing the electrical circuit arrangements in the structures made by assembling the elements of the building set.

Accordingly, an essential feature of the invention is a method which is characterized in that the structures referred to are assembled by clamping together a plurality of elements comprising electrical components and provided with connecting means for interconnecting a pair of adjacent elements, and that the electrical circuits are established by the mechanical connection of said elements.

In a building set, adapted to the use of this method, at least some of the elements must include the necessary electrical components for constituting the electrical circuit in the finished structure made by assembling the elements of the building set and must further be provided with means for achieving the combined mechanical and electrical connections between the elements.

Another characteristic feature of the invention, therefore, consists in the provision of an element for a model or toy building set of the kind referred to, said element comprising an electrical component, which is electrically connected with a portion of the surface of the element, said portion being electrically conductive and adapted to contact the surface of an adjacent element.

In an embodiment of the invention in which the element is a hollow toy building block of the kind referred to, and is provided with coupling studs or primary projections, the electrical component is included in the cavity of the block, and the electrically conductive part of the surface comprises at least one of said primary projections.

Among the various other forms and embodiments of the invention which will now be described with reference to the accompanying drawings are typical examples of toy or model building elements comprising casings or housings for electrical batteries or motors and provided with coupling studs which serve both as terminals of the batteries or motor included in the elements or adapted to be inserted therein, and as mechanical connectors interconnecting said housings or casings with adjacent elements belonging to the same building set.

Figure 7:
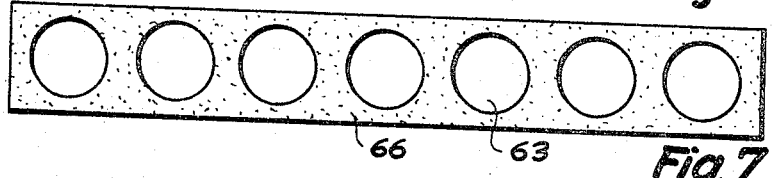
Figure 8:
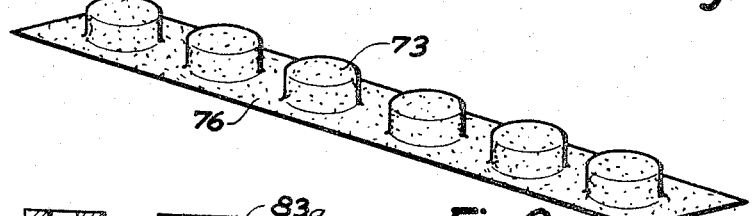
Figure 9:
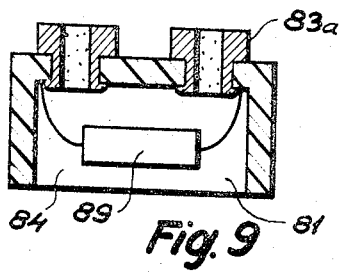
Figure 10:
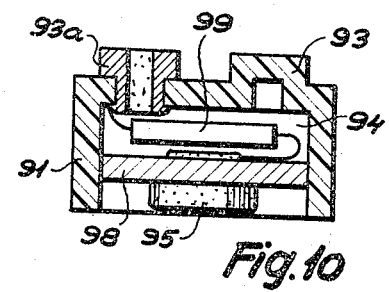
Figure 11:
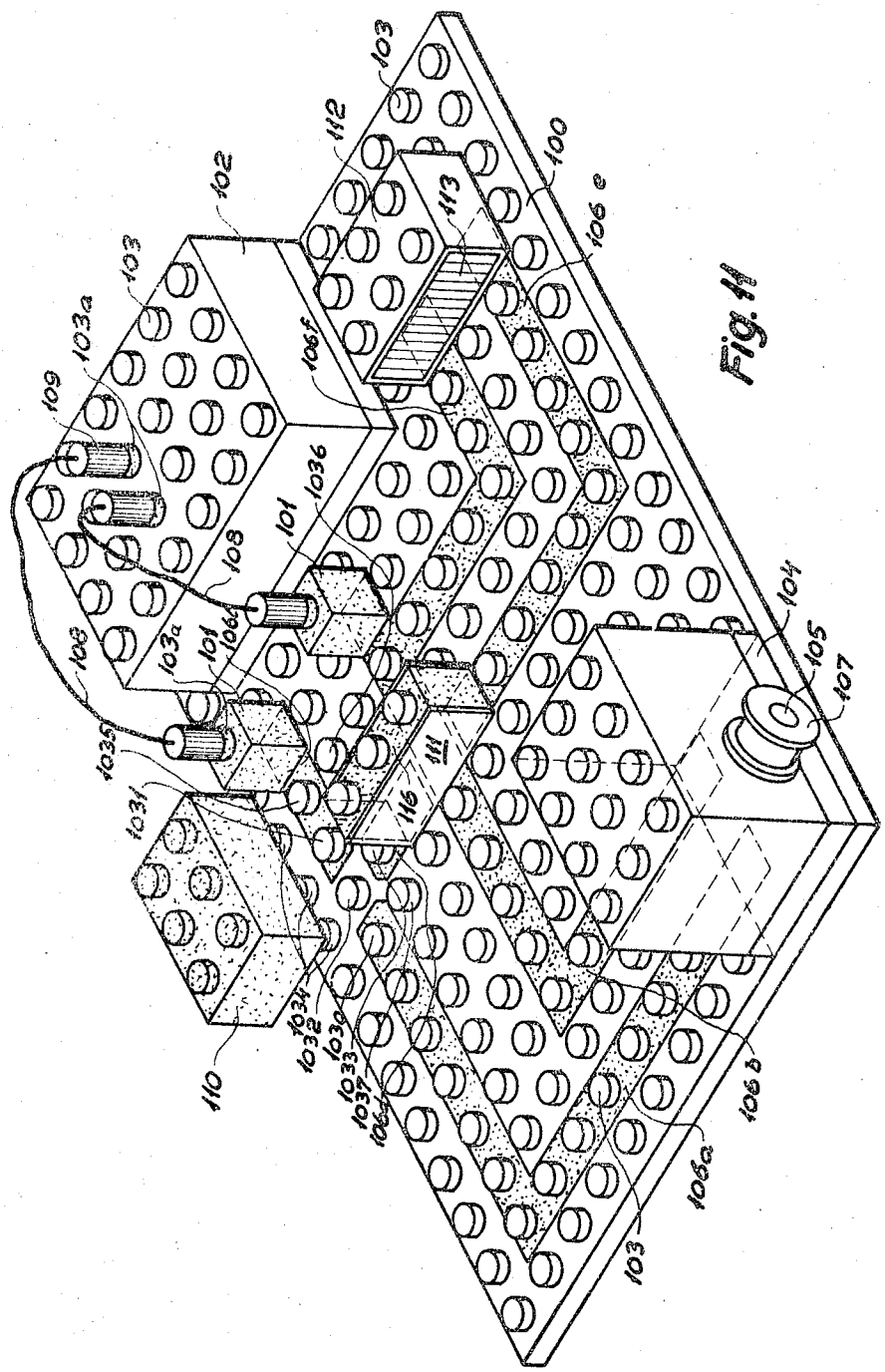
Figure 12:
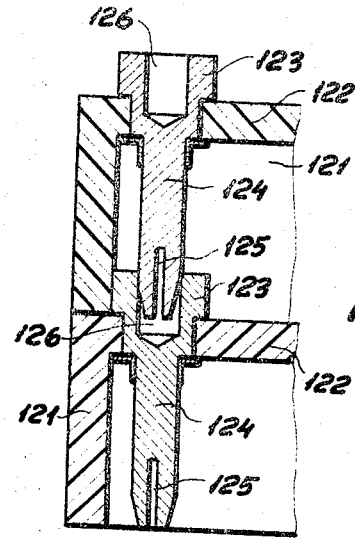
Figure 13:
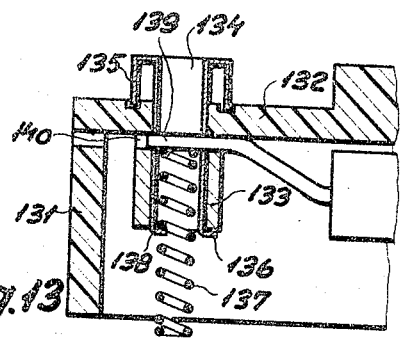
Figure 14:
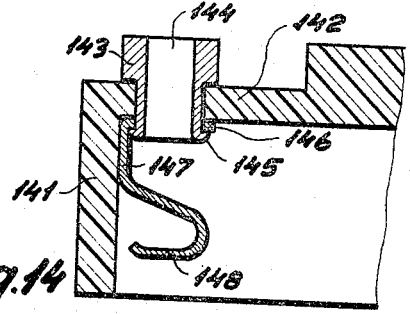
Figure 15:
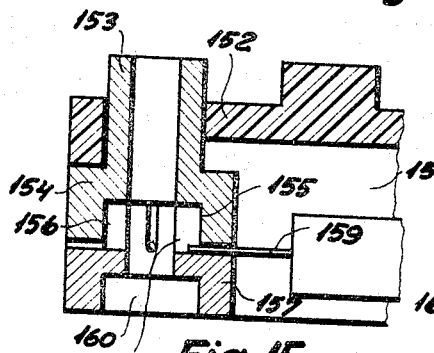
Figure 16:
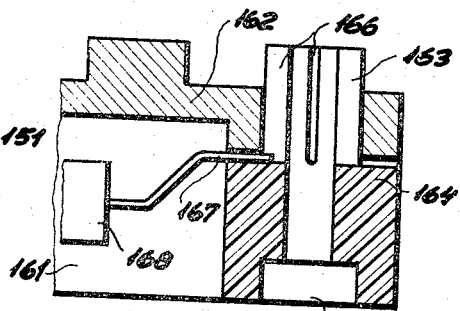

In the drawings:

FIGS. 1–4 illustrate four different embodiments of model building elements according to the invention, FIGS. 5–8 show sections of metal foil for providing conductive metal coating on the surface of the building elements, FIGS. 9–10 show two different specific building elements with built-in electrical components, FIG. 11 is a perspective view of a structure assembled by interconnecting model building elements according to the invention, FIG. 12 is a vertical end section of two building elements of a specific embodiment of the invention, FIG. 13 shows one end of a further embodiment with a built-in electrical component, FIG. 14 shows a further embodiment, FIGS. 15 and 16 illustrate various embodiments provided with specific means for connecting the lead ends of an electrical component, FIG. 17 shows an embodiment having electrical conductors disposed within the cavity, and FIGS. 18 and 19 show a further embodiment provided with an electrical component within the cavity.

FIG. 1 shows a model building element consisting in a manner known per se of a hollow, box-shaped block 1, the upwardly facing bottom surface 2 of which is provided with cylindrical coupling studs 3, so disposed that four studs form the corners of a square. Located in the cavity 4 of the block under the centre of this square there is a coupling member 5 which when two model building elements are coupled together will fit in between four of the external coupling members 3. Two of the external studs are shown also as tubular studs 3a, and the whole building element is covered by a quite thin coating 6 of electrically conductive material. This may be a metal film sprayed on to the surface of the element or applied in any other way after the manufacture of the element, but it may also be a plastic material which has been made conductive by the addition of adequate amounts of conductive powder material.

Thus the element shown here is conductive over its entire surface and may be used for establishing electrical contact with other elements of the same or a similar type. In many cases, however, it may be desirable to provide a more complex electric circuit, for instance where line crossings are required and where it is desired to connect several other components.

FIG. 2 shows an embodiment which is adapted to provide such specific connections and which comprises a box-shaped hollow model building element 11 made from an insulating material. Like the element of FIG. 1 this element has a bottom surface 12 provided with external studs 13, and in the cavity 14 there are also studs 15.

To make part of the surface conductive a metal strip 16 is disposed over the surface, extending partly along the upwardly facing side of the bottom 12 and partly downwardly along the sides of the block 11 and having further a bent portion 17 extending inwardly beneath the edge of the said side wall. The metal strip 16 has cut-outs 18 matching the circumference of the studs 13 so that the strip is securely retained in position.

In the embodiment shown in FIG. 2 there are two tubular studs 13a which are made of metal and riveted to the bottom surface 12 so that they form mechanical coupling means but may serve also as electrical connecting means to establish electrical contact with electrically conductive surface members of another building element.

FIG. 3 shows a specific element consisting, like the others, of a hollow, box-shaped block 21; this block is metal coated and provided with an external tubular stud 23a in which a lead 28 is secured by soldering. Such an element can be used for establishing connection from a detachable moveable lead to any other model building element when disposed over one of the coupling studs, for instance 3, 3a, 13 or 13a.

The building element shown in FIG. 4, like the element 21, consists of a box-shaped hollow block 31 with a metal coating and a tubular stud 33a; here no lead has been inserted, but the inside diameter of the tubular stud is adapted to receive a plug 39 mounted at the end of a lead 38. In the drawing the lead has been introduced into the cavity 34 of the element, but it may, of course, equally well be inserted from above, just as the lead of the embodiment shown in FIG. 3 may be introduced into the tubular stud 23a through the cavity 24 of the element.

Figure 6:
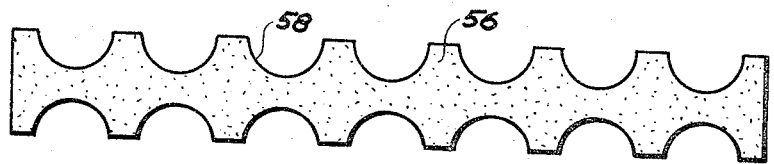

FIG. 5 shows a sheet 40 of thin metal foil which is provided with regularly located openings 43 spaced apart by the same distance as the coupling studs 3, 3a, 13 and 13a of the building elements shown in FIGS. 1 and 2. From such a sheet 40 strips may be cut as illustrated in FIGS. 6 or 7. The strip 56 shown in FIG. 6 corresponds to the strip 16 in FIG. 2 and is provided with semi-circular cutouts 58 matching the circumference of the coupling studs when the strip is disposed on a building element.

In FIG. 7 the strip 66 has been obtained by cutting the sheet 40 of FIG. 5 between the rows of openings and thus comprises a row of openings 63 for receiving the coupling studs and forming a metal surface over a section of a building element.

FIG. 8 illustrates a modified embodiment of a strip 76 which is provided with cylindrical portions 73 spaced apart by such distance and of such internal diameter and height that the strip 76 can be fitted on a building element of the said type and the coupling studs will fit in the spun portions 73.

The aforesaid building elements solely comprise elements where the electrical components are lengths of lead, but for assembling apparatus in a simple and rapid manner it is desirable to have also elements containing resistors, capacitors or other electrical components.

FIG. 9 presents a sectional elevation of an element consisting like the foregoing of a hollow box-shaped block 81. It is made from an insulating material and is provided with tubular metal coupling studs 83a. To two of these studs are connected two supply lines of a resistor element 89 located within the cavity 84 of the element.

FIG. 10 represents a slightly modified embodiment comprising a box-shaped element provided with studs 93 consisting, like the block, of an insulating material, but having one stud 93a which is of metal and tubular. Within the cavity 94 is mounted an intermediate panel 98, in which is secured a tubular metal stud 95, the diameter and location of which correspond to the coupling stud 5 in FIG. 1. To this metal stud and to the metal stud 93a the two ends of a capacitor 99 are connected, and it will be obvious that this capacitor can be inserted in an electric circuit.

While various embodiments of building elements of the type covered by the invention have now been described, it will be obvious that these building elements may be varied infinitely. Where larger building elements are used it will, for instance, be possible to incorporate elements comprising small motors, lamps or the like, and also semiconductor elements or relays with several supply lines may be used. In that case it is only necessary to provide the required number of conductive, but mutually insulated connecting means to which the supply line of the electrical component may be connected. A building element may also comprise several electrical components which are electrically separated or electrically interconnected.

FIG. 11 shows an apparatus mounted on a base plate 100 which is provided with coupling members in the form of studs 103, by means of which i.a. a battery casing 102 is secured. The battery casing is likewise provided with coupling studs 103 and has two studs 103a formed as metal sockets, into which is inserted a plug 109 mounted on leads 108, which at the other end are soldered to studs 103a of entirely metallized building elements 101. These building elements serve to provide connection from a battery to a supply network disposed on the base plate 100 and explained in detail below.

The embodiment shown in FIG. 12 comprises a box-shaped element 121 having in the upwardly facing bottom 122 a metal stud 123 with a portion 124 extending downwardly into the cavity, pointed at the lower end and provided with a slit 125 so that this lower, pointed portion can penetrate into a central recess 126 in subjacent element.

FIG. 13 shows a modified embodiment comprising a block 131 with an upwardly facing bottom 132 provided with a metallic tubular member 133 extending into the cavity and within which there is a coupling stud 134 formed as a tubular socket and supported on the outer face of the bottom by means of a bent portion 136 extending over the edge of the tubular member 134. In the tubular member 134 is inserted a helical metal spring 137 extending slightly beyond the cavity of the box-shaped element, thereby serving to make contact with a corresponding connecting member of a subjacent building element. The spring 137 is retained partly by means of bent webs 138 and partly by engagement with a lead end 139 inserted in a transverse bore 140 in the tubular member 133.

In the embodiment illustrated in FIG. 14 the building element likewise comprises a block 141 with a bottom 142 and disposed therein a metallic connecting member 143 with a bore 144. The connecting member is retained in position by means of a riveting 145, below which is a collar 146 on a connecting member 147 consisting of spring metal and having a flexible contact face 148 to form electrical connection with a corresponding subjacent element.

FIG. 15 shows an embodiment of a box-shaped element 151 with a bottom 152 and a coupling member 153 extending upwardly through the bottom and having a widened portion 154 at the lower end which forms part of the outer wall of the building element 151. The widened portion has a central recess 155 for receiving a stud 156 of a connecting member 157, and the stud 156 moreover has a vertical slit 158 serving to receive a lead member 159. At least one of the members 153 and 157 consists of metal or is metallized to make contact with adjacent building elements and with the lead member 159. The said connecting member 157 is provided at the lower end with a recess 160 for receiving a coupling member corresponding to the coupling member 153 of an adjacent building element.

FIG. 16 shows a building element with a bottom 162, into which is inserted a coupling member 163 having at the lower end a widened portion 164 forming a substantial portion of the side wall of the building element and extending downwardly right to the edge of the open side of the box-shaped element and having a recess 165 for receiving a corresponding coupling member. The portion of the coupling member projecting upwardly through the bottom 162 is provided with slits 166 serving to receive the lead end 167, thus forming on insertion of the coupling member 163 a section of the outer wall of the element and establishing connection to an electrical component 168 located in the cavity through the lead 167 and the metal connecting member 163.

FIG. 17 shows a building element 171 with a bottom 172 provided on the outer face with coupling means 173. Within the cavity of the box-shaped building element there is an electric conductor 174 secured by means of two rivetings 175 and the ends of which form contact means 176 which are bent outwardly under the lower edges of the block walls, where they may serve to make contact with another building element 177 having a conductive surface either on its upper face or on the coupling means.

FIGS. 18 and 19 shows a slightly modified embodiment comprising a box-shaped building element 181 with a bottom 182 and coupling means 183. In the cavity of the box-shaped block there is an electrical component 184. Each of the supply lines 185 of this component is disposed, as shown in FIG. 19, between studs 186 where they are clamped or retained by the studs being deformed by heat. The supply lines are carried downwardly along the inner face of the wall 181 of the box-shaped element and are provided at the lower edges thereof with bent portions 187 forming contact means for connection to corresponding building elements.

Apertured strips have been made from metal sheet and disposed on the base plate 100. These strips may conveniently be adhesive on the face by which they engage the base plate to be held effectively in position. In one corner of the base plate is mounted a building element 104 provided with a built-in motor with a projecting shaft 105 to which is attached a wheel 107. The connection of the electrical supply to this motor is provided by means of two metal strips 106a and 106b having holes for receiving the coupling studs 103 of the base plate. The strip 106b leads directly to one of the two metallized building elements 101, while the strip 106a is terminated at a stud 1030 and a shorter length of strip 106c leads from a stud 1031 to another of the metallized building elements 101, and between the studs 1030 and 1031 there is a single non-conductive stud 1032. From the stud 1033 in the adjacent row of studs which is located opposite the stud 1032 extends a strip 106d which is connected to a stud immediately adjacent to the strip 106b, and from a stud immediately on the other side of this strip a new strip 106e extends parallel to another strip 106f extending from the stud where the metallized building element 101 is connected to the strip 106b.

The building element 104 is provided in the bottom with contact means cooperating with the ends of the two strips 106a and 106b, and for connecting the power element 102 via the two leads 108 to the motor of element 104 the only thing required is connection between the two metal strips 106a and 106c. This is effected by means of a metallized six-stud building element 110, i.e. an element having two rows of coupling studs with three studs in each row. If this element, which is shown raised from the base plate, is disposed to grip the studs 1030, 1031 and 1032 and the studs 1034 of the adjacent row, the said connection will be established and the motor will be started. But with this location of the metallized building element 110 no connection will be established with the metal strip 106d. For establishing contact between this metal strip and the metal strip 106e, a building element 111 has been disposed across the strip 106b. The building element 111 is provided with a metal strip 116 extending upwardly over the upwardly facing upper surface provided with coupling studs 103 and carried downwardly under the edge of the element, whereby this metal strip will contact the two metal strips 106d and 106e. At the ends of the two metal strips 106e and 106f is a further building element 112 with a built-in window 113 in which an electric lamp is mounted, and the element is provided with contact members which, when the element is positioned on the base plate 100, will make contact with the two metal strips 106e and 106f. If the metallized element 110 is moved to a position where it grips the studs 1031 and 1032 and the adjacent stud 1035 of the same row and simultaneously grips the stud 1033 and to further studs 1036 of that same row, connection will be established to the lamp of the element 112, but not to the motor in the element 104. The element 110 may be displaced to again grip the studs 1030, 1031 and 1032 and simultaneously the stud 1033, whereby it will grip one of the studs 1036 and the stud 1037 of the same row, on which connection will be established from the metal strip 106c to both the metal strips 106a and the metal strip 106d, and current will be supplied both to the motor and to the lamp.

It will be obvious that an assembly like this can be accomplished within a very short time, and on the other hand it is only one example of the many possibilities of combination afforded by the method and the building element defined by the invention.

The metal coated elements may also be made entirely of metal.

I claim:

1. In a toy building set having a plurality of blocks, each block having a hollow parallelepiped body open at one face, a bottom and four side walls defining a cavity, at least one primary projection extending normally outwardly from said bottom, at least one secondary projection within said cavity, the position of said secondary projection relative to the walls being such that a primary projection of a block can be clamped between at least one side wall and at least one secondary projection of another similar block the improvement wherein at least one primary projection is electrically conductive and at least one electrical component is located in the cavity of said blocks and electrically connected with said conductive primary projection.

2. A block as claimed in claim 1 in which the component within the cavity of the block is a source of electricity.

3. A block as claimed in claim 1 in which the component within the cavity of the block is a transistor.

4. A block as claimed in claim 1 in which the component within the cavity of the block is a capacitor.

5. A block as claimed in claim 1 in which the component within the cavity of the block is a resistor.

6. A block as claimed in claim 1 in which the component within the cavity of the block is a motor.

7. A block as claimed in claim 1 in which said secondary projection is a spring member.

8. A block as claimed in claim 1 in which said secondary projection is an electrically conductive member electrically connected with said electrical component.

9. In a toy building set comprising at least one base plate which has a plurality of primary projections extending normally from one face thereof and equally spaced apart in lengthwise and transverse directions, a plurality of hollow parallelepiped building blocks open at one face having a bottom and four side walls defining a cavity, at least one primary projection extending normally outwardly from said bottom and at least one secondary projection within said cavity, the position of said secondary projection being such that a primary projection can be clamped between at least one side wall and at least one secondary projection of the blocks, the improvement wherein at least a portion of one of said building blocks has a conductive area on its surface adapted to contact said base plate when positioned therefor, and wherein electrical conductors are provided which are adapted to be placed on said base plate for electrically connecting the conductive areas of the building blocks mounted on said base plate whereby electrical component located within the cavities of said blocks can be electrically connected.

10. In a toy building set, as claimed in claim 9, wherein said electrical conductors comprise a metal strip provided with a plurality of apertures adapted to receive coupling studs of said base plate.

References Cited

UNITED STATES PATENTS

| | | | |
|---|---|---|---|
| 2,742,626 | 4/1956 | Collins et al. | 339—176 |
| 2,967,267 | 1/1961 | Steinman et al. | 317—101 |
| 3,005,131 | 10/1961 | Melcher et al. | 317—101 |
| 3,005,282 | 10/1961 | Christiansen. | |
| 3,034,254 | 5/1962 | Christiansen. | |
| 3,162,973 | 12/1964 | Christiansen. | |
| 3,236,004 | 2/1966 | Christiansen. | |
| 3,242,610 | 3/1966 | Christiansen. | |
| 3,284,946 | 11/1966 | Christiansen. | |

FOREIGN PATENTS 641,931    7/1962    Italy.

ROBERT K. SCHAEFER, *Primary Examiner.*

M. GINSBURG, *Assistant Examiner.*